June 15, 1965 K. R. ANDERSON ETAL 3,189,725
ELECTRIC WATER HEATING AND STORAGE DEVICE
Filed Nov. 6, 1963
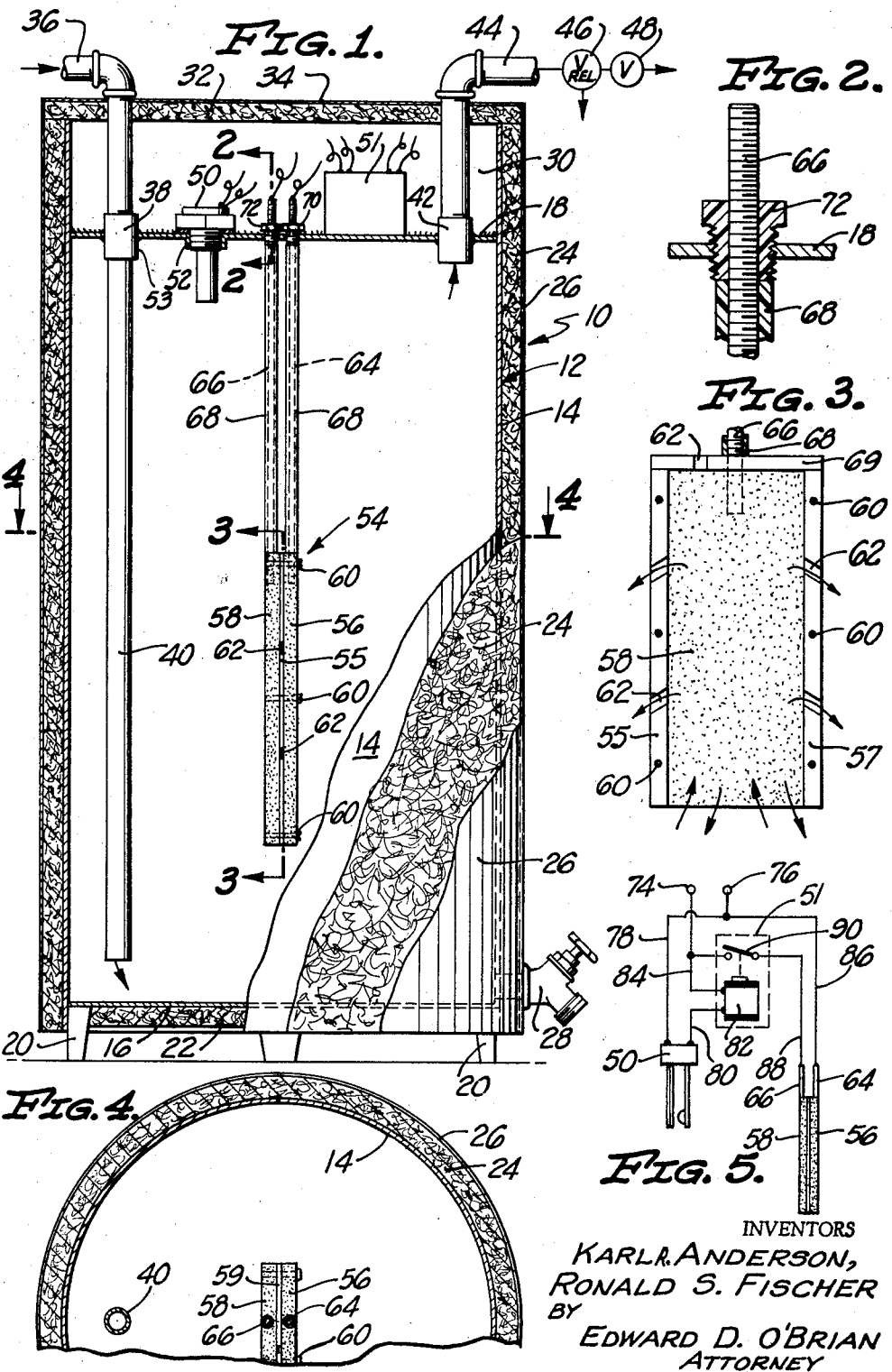
INVENTORS
KARL R. ANDERSON,
RONALD S. FISCHER
BY EDWARD D. O'BRIAN
ATTORNEY United States Patent Office 3,189,725
Patented June 15, 1965

3,189,725
ELECTRIC WATER HEATING AND STORAGE DEVICE
Karl R. Anderson, 3536 Locksley Drive, Pasadena, Calif., and Ronald S. Fischer, 9702 E. Callita St., Arcadia, Calif.
Filed Nov. 6, 1963, Ser. No. 321,901
1 Claim. (Cl. 219—293)

This invention is directed to a storage hot water heater which heats and stores hot water for use.

In the art of heating hot water for residential and industrial use, many different types of heaters are known. The heater of this invention falls within the class of being electrically powered and having a storage vessel for the storage of heated water. Even in this relatively limited class prior hot water heaters have shown distinct disadvantages. Electrical resistance elements are mounted in sealed members of different configurations and are immersed within the water in the hot water reservoir. When such heaters are energized, heat is transfered through the protective casing and through the water for the heating thereof. Obviously deposits coat the coils and heating becomes inefficient due to the relatively poor heat transfer coefficient. Furthermore the rate of heat exchange is such that convection currents of adequate activity are not set up within the heater and the water in the bottom of the heater remains cold to thus limit the supply of available hot water. For this reason in the past electric water heaters have been of tremendous size and inapplicable to locations where size is an important consideration.

Accordingly it is an object of this invention to provide a hot water heater of small size but with high input rate so that large quantities of hot water can be supplied in a short time.

It is another object of this invention to provide a hot water heater with strong circulation currents so that the entire reservoir of hot water is quickly heated.

It is another object of this invention to provide adequate safety features so that there is no danger to the hot water heater or any of its elements due to malfunction or maloperation.

Other objects and advantages of this invention will become apparent from a study of the following portion of the specification and the attached drawings in which:

FIGURE 1 is a vertical section through the hot water heater of this invention;

FIGURE 2 is a section taken along line 2—2 of FIGURE 1;

FIGURE 3 is a section taken along line 3—3 of FIGURE 1;

FIGURE 4 is a section taken along line 4—4 of FIGURE 1; and

FIGURE 5 is a schematic drawing of the electric circuit for controlling the hot water of this invention.

It can be stated in essentially summary form that this invention is directed to a combined electrically heated hot water heater and storage vessel. Electrical heating is accomplished by a pair of closely spaced carbon electrodes to which potential is applied. Conductivity of the water between the electrodes in the storage vessel causes current flow between the electrodes which results in heating of the water. The electrodes are mounted with the space therebetween in a substantially vertical direction so that convection currents within the tank are substantially aided. Such convection currents occupy substantially the entire tank, as is dictated by the position of the electrodes within the tank. An immersion thermostat detects water temperature and controls power to the electrodes in order to maintain the water temperature substantially constant. The water inlet is near the bottom of the tank and is positioned below the lower most portion of the electrodes, as is hereinafter described. Water outlet is adjacent the top of the tank at a point substantially most distant from the inlet so that no direct flow occurs therebetween.

A further, more detailed understanding of the invention will be obtained by a study of the following portion of the specification wherein the drawings are referred to in detail. Referring now to the drawings, the hot water heater of this invention is generally indicated at 10. The hot water heater 10 comprises the pressure vessel 12 having a shell 14, a lower head 16 and an upper head 18. The heads are suitably secured to the shell at all joints to insure water tight integrity, and the material thereof is of adequate thickness to withstand the pressures to which the pressure vessel 12 will be subjected. Secured to the lower head 16 are legs 20 which serve to support the entire hot water heater. Shell 14 extends below the lower head 16 to a sufficient distance to provide a pocket for insulation 22. Further insulation 24 is positioned around the shell 14 and is covered by jacket 26 for appearance and mechanically protective purposes. The insulation 22 and 24 is of adequate thermal properties to conserve heat and to prevent the jacket 26 from reaching objectionable temperatures. Drain valve 28 passes through jacket 26, insulation 24 and is secured to shell 14. Drain valve 28 permits the drainage of sludge and sediment from the pressure vessel 12 and permits drainage of the system should conditions so dictate.

As is seen in the upper part of FIGURE 1, the shell 14 extends a considerable distance above the upper head 18 to form pocket 30 in which are located all of the necessary connections to the present hot water heater. The pocket 30 is closed by means of insulation 32 which has protective and decorative cover 34. Cold water is supplied from a conventional source through inlet line 36 which is connected to pass through the cover 34, through 32 and is connected into coupling 38. Coupling 38 is welded in pressure tight manner in a perforation in the upper head 18. Inlet dip pipe 40 extends from the coupling 38, where it is secured to terminate substantially adjacent the lower head 16 so that inlet water is delivered adjacent the bottom of the pressure vessel 12. Outlet coupling 42 is welded into another aperture in the upper head 18 so that it is substantially as far away from the end of the inlet dip pipe as is possible within the pressure vessel. Outlet line 44 is connected to the outlet coupling 42 and passes through a suitable aperture in the insulation 32 and cover 34. Connected to the outlet line 44 are conventional relief valve 46 which prevents over pressure within the vessel 12 and distribution valve 48 which controls the distribution of heated water to the point of use.

Immersion thermostat 50 is positioned in boss 52 in the upper head 18 to detect the temperature of the water within the vessel 12 and to control the heater therein. Thermostat 50 is of conventional construction and is electrical in character so that reduction in temperature below the desired temperature closes a contact. If desired, thermostat 50 may be of adjustable nature to permit closing of the contact at different temperatures of water within the vessel 12. A hole is drilled in the coupling 38 at 53 and the hole is positioned to direct cold water from the cold inlet line onto the thermostat 50. Mounted within the pocket 30 and electrically connected to the thermostat 50 is a relay 51. The particular nature of the electrical connections will be hereinafter described with respect to FIG. 5.

The heater element itself is generally indicated at 54 and comprises first and second electrodes 56 and 58. The electrodes 56 and 58 are rectangular solid blocks of carbon maintained in spaced relationship. Spacing of the electrodes is maintained by means of side spacer strips 55 and 57 and top spacer strip 59. The spacer strips are are relatively narrow and are of the thickness desired for electrode spacing. The sandwich of the electrodes 56 and 58 with the spacer strips 55, 57 and 59 therebetween is held together by means of insulated screws 60. To maintain the proper insulation between the electrodes 56 and 58, these spacer strips 55, 57 and 59 as well as the screws 60 are made of polytetrafluoroethylene, or some other strong material of high dielectric strength. This construction forms a closed pocket, except for the bottom opening, which is bounded by the inside surfaces of the electrodes and the spacer strips. In order to provide proper water circulation, notches 62 are cut part way through the strips 55 and 57. As is shown in FIG. 3, these notches 62 are directed so that water entering the bottom of the pocket between the electrodes and flowing out through notches 62 is directed downwardly as it issued from the notches. There should be sufficient notches 62 and the notches 62 should be of sufficient size, to permit proper circulation as is hereinafter described. Furthermore, one or more notches 62 may be cut through the spacer strip 59, should such aid circulation characteristics.

Threaded rods 64 and 66 are respectively threaded into the electrodes 56 and 58 to serve as mechanical support and electric busses for the conduction of electric current therebetween. Rods 64 and 66 each have an insulating tube 68 mounted thereon to prevent conduction of electricity therebetween. The rods 64 and 66 are respectively threaded through plugs 70 and 72 which in turn are threaded into the head 18. Both plugs 70 and 72 are of polytetrafluoroethylene or of some other suitable material having adequate dielectric strength and mechanical properties under the conditions to which they are subjected in this application. Electrical connections connect the rods 64 and 66 to the remainder of this circuit.

As is seen in FIG. 5, power is supplied to the water heater of the instant invention through terminals 74 and 76. Terminal 76 is connected by line 78 to one side of the switch of thermostat 50 and the other side of the switch is connected through line 80 to coil 82 of relay 51. The other side of coil 82 is connected by line 84 to terminal 74. Line 86 connects terminal 76 to bus rod 64 and thence to electrode 56. The electrode 58 is connected through bus rod 66 and line 88 to one side of normally open contactor 90 within relay 51 which is controlled by coil 82. The other side of normally open contactor 90 is connected to line 84 and thence to terminal 74. It can be seen from this electrical circuit that when an electrical potential is supplied across the terminals 74 and 76, it is ready for energization. Thus when the switch in the thermostat closes for the reason that the water in the vessel 12 is at too low a temperature, the coil 82 is energized to close normally open contactor 90. Thereupon potential is established across the electrodes 55 and 58.

Alternatively to the structure shown, it is feasible to secure a suitable thermostat on the outside of either of the upper or lower heads, or on the shell 14 at any convenient location. If located toward the bottom of the tank, it should be directly influenced by the incoming cold water, and if located higher on the tank a suitable water jet should be directed from the cold inlet water line toward the thermostat to provide early actuation therefor. Alternatively to the electrical schematic of FIG. 5, should the thermostat so permit, the relay 51 may be dispensed with and the current to the electrodes can be directly supplied through the thermostat contacts.

In operation it can be seen that the hot water heater 10 of this invention is positioned and suitably connected to inlet and outlet water lines as well as to a supply of electric current. In view of the fact that heating efficiency is excellent and recovery rate is high, the vessel 12 may be of minimum size and thus may be positioned in relatively confined locations. Thus, the hot water heater of this invention may be readily used in trailers and motel units, and other locations where space is at a premium. After connection, the vessel is filled with water and the electrical connections are closed. If the water within the vessel 12 is below the desired temperature as determined by thermostat 50, the thermostat switch will be closed and the coil 82 energized. With contactor 90 closed potential is applied across the electrodes 56 and 58. Current is conducted between the electrodes through the water in the space therebetween. Due to the electrical resistance of the water, such conduction rapidly heats the water and causes rapid convective circulation. Such circulation is created for the water in the space between the electrodes experiences a substantial temperature rise before convection carries it away. Convection is rapid, and thus the entire body of water within the vessel 12 is heated.

When water is withdrawn from the vessel 12, due to demand of use, cold water is supplied through the inlet 36 and some of it is discharged through the hole 53 upon the thermostat 50. This hole is of moderate size and directs only a sufficient stream to promptly turn on the thermostat 50. For example, if the tank is full of hot water and the distribution valve 48 is open, it only takes about 15 seconds for the thermostat valve 50 to turn on. This is strongly contrasted to the earlier structures where it is necessary to remove a considerable amount of hot water from the vessel before the heater is turned on.

The particular design of the electrodes and their spacers is important to the success of the heater of this invention in performing its most desirable function as a heater for small installations. Upon inspection of the electrode and spacer structure of FIG. 3, it would be assumed that water flows upward into the bottom space between the electrodes and out through the notches 62. There is flow in this direction, but the more important circulating function occurs by heating of the water in the semi-enclosed space, which thereupon ejects itself forcibly downward and causes tremendous circulation in addition to the normally, expected convection current. By this action the entire water contents of the vessel 12 is held at substantially the same temperature so that the entire amount is available for withdrawal. Furthermore, the particular electrode structure in FIG. 3 has an additional definitive advantage. This advantage has to do with the electrical resistance of the water as a function of temperature. When water temperature is increased from 70° F. to 140° F. the amount of power drawn by a conventional pair of spaced electrodes within the water increases by about 33%. This is objectionable insofar as power requirements are concerned, for electric lines of maximum size are necessary even though the electrodes are drawing less than full power at the lower temperatures. Furthermore, the greater power input is when the temperature is higher and this results in slower recovery of the heater when it is entirely filled with cold water. By the particular construction shown in the drawings, the water in the space between the electrodes is always warm so that in a particular example shown there is only an 11% increase in power when the temperature changes from 70° F. to 140° F. Such characteristics are a function of the particular dimensions of the electrodes, their spacing, and the nature and size of the notches 62. Sandwiches of somewhat different constructions and dimensions can give somewhat different results in this respect.

The positioning of electrodes 56 and 58 within the vessel 12 is important. The electrodes should be positioned near the axis of the vessel 12 for most favorable circulation, and they should be positioned reasonably near the bottom head 16 to make sure that no stratification of cold water occurs at the bottom of the tank. However the bottom of the electrodes 56 and 58 should be positioned somewhat above the bottom of the inlet dip tube 40. Thus, if difficulties in thermostat 50 or relay 51 do not disconnect the electric potential between electrodes 56 and 58, steam is formed within the vessel 12 and the water is forced back out of the inlet dip tube 40 and inlet line 36. This steam thus formed creates a space between the electrodes 56 and 58 and automatically shuts off conductivity therebetween. In normal operation, when the temperature of the water within vessel 12 reaches the desired temperature, thermostat 50 opens its switch which causes deenergization of coil 82 and opening of normally open contact 80 to thus deenergize the electrodes. The entire vessel 12 of water is up to the desired temperature and the entire amount can be drawn off and used by opening of valve 48. Since the inlet dip tube 40 and the outlet coupling 42 are diagonally across the tank, no short circuiting of water flow occurs when hot water is being withdrawn.

The recovery of the electric hot water heater of this invention is very great because of the efficient manner in which the electric power is converted to heat directly in the water. Scale forming problems are eliminated, for no scale is formed upon the electrodes 56 and 58 for they are not heated. In view of the particular construction of this heater, and the presence of cold carbon electrodes which do not form scale, no magnesium rod is needed in the heater of this invention for the purpose of being consumed from electrolytic damage. No electrolysis takes place and thus the entire device is protected from this type of damage. Accordingly this heater is of design which also requires only limited maintenance.

It is clear from the above disclosure that this invention is directed to an electric hot water heater capable of assuming numerous embodiments without the exercise of inventive faculty. While the preferred embodiment is shown, the scope of the following claim defines the scope of this invention.

We claim:

A hot water heating and storage device, said hot water heating and storage device comprising:

a vessel adapted to contain water during heating and storage thereof, water inlet and water outlet means connected to said vessel to respectively permit the entry of water into said vessel and to permit the withdrawal of hot water from said vessel;

first and second spaced electrodes mounted within said vessel for the heating of water therein, said first and second electrodes being made of carbon, said first and second electrodes each being of rectangular configuration defined by side, top and bottom edges of said electrodes, said electrodes being of substantially the same size and having faces facing each other;

spacers mounted between said faces of said electrodes, said spacers being of high dielectric strength and extending substantially continuously along said side edges and along said top edges of said electrodes, the opening defined by said bottom edges of said electrodes being unimpeded, at least one opening in each of said spacers between said side edges and between said top edges of said electrodes so as to substantially limit circulation of water past said faces of said electrodes so that water between said electrodes is heated to a temperature substantially higher than the temperature in the remainder of said vessel but below the boiling point of the water;

mounting means for mounting said first and second electrodes within said vessel, said mounting means being electrically insulated so that said first and second electrodes are insulated with respect to said vessel, said mounting means securing said electrodes within said vessel so that said faces extend in a substantially vertical direction within said vessel so that said top edge of said electrodes are positioned upward within said vessel; and means adapted to supply an electric potential to said electrodes so as to be adapted to cause electric conductivity through water between said electrodes with the resultant heating thereof whereby water between the electrodes is heated substantially independently of the temperature of the remaining water within said vessel.

References Cited by the Examiner

UNITED STATES PATENTS

| 1,525,508 | 2/25 | McCormick | 219—292 |
| 1,553,491 | 9/25 | Werner | 219—314 |
| 1,698,801 | 1/29 | Martin | 219—288 |
| 1,725,832 | 8/29 | Shriner | 219—297 |
| 2,783,355 | 2/57 | Vassiliev | 219—293 |
| 2,850,610 | 9/58 | Kasuga | 219—295 X |

FOREIGN PATENTS 119,919   5/45   Australia.

RICHARD M. WOOD, *Primary Examiner.*

ANTHONY BARTIS, *Examiner.*